United States Patent
Osawa et al.

(10) Patent No.: US 10,648,878 B2
(45) Date of Patent: May 12, 2020

(54) OIL PRESSURE SENSOR ATTACHMENT STRUCTURE

(71) Applicant: Nidec Tosok Corporation, Zama-shi, Kanagawa (JP)

(72) Inventors: Tomoka Osawa, Zama (JP); Hiroshi Shirai, Zama (JP); Toshiaki Nakamura, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 244 days.

(21) Appl. No.: 15/922,957

(22) Filed: Mar. 16, 2018

(65) Prior Publication Data
US 2018/0283970 A1 Oct. 4, 2018

(30) Foreign Application Priority Data

Mar. 30, 2017 (JP) .................................. 2017/067249

(51) Int. Cl.
*G01L 19/06* (2006.01)
*G01L 9/00* (2006.01)
*G01L 19/00* (2006.01)

(52) U.S. Cl.
CPC .......... *G01L 9/0041* (2013.01); *G01L 19/003* (2013.01); *G01L 19/0609* (2013.01)

(58) Field of Classification Search
CPC .. G01L 9/0041; G01L 19/003; G01L 19/0609
See application file for complete search history.

(56) References Cited

U.S. PATENT DOCUMENTS

| 4,445,382 A * | 5/1984 | Reynolds | G01L 19/0609 73/716 |
| 4,563,697 A * | 1/1986 | Miura | G01L 19/003 174/50.54 |
| 4,843,454 A * | 6/1989 | Kato | G01L 19/0061 257/419 |
| 5,319,980 A * | 6/1994 | Kremidas | G01L 9/0051 29/621.1 |
| 5,665,920 A * | 9/1997 | Martin | G01L 9/0075 73/715 |

(Continued)

FOREIGN PATENT DOCUMENTS

| JP | 63-228038 A | 9/1988 |
| JP | 2001-271918 A | 10/2001 |

(Continued)

*Primary Examiner* — David J Bolduc
(74) *Attorney, Agent, or Firm* — Keating & Bennett

(57) ABSTRACT

According to one aspect of the present invention, there is provided an oil pressure sensor attachment structure including: the oil path body; the sensor case; and a fixing member which fixes the sensor case to the oil path body. The sensor case has a columnar portion which is disposed along a central axis extending in an up and down direction, and a flange portion which protrudes from the columnar portion to an outside in a radial direction. The fixing member has a fixing portion which comes into contact with the oil path body and is fixed thereto, and a pressing portion which comes into contact with the upper surface of the flange portion and presses the flanges portion against the oil path body. The fixing portion and the pressing portion are disposed with an interval therebetween.

12 Claims, 8 Drawing Sheets

(56) References Cited

U.S. PATENT DOCUMENTS

| | | | | |
|---|---|---|---|---|
| 5,834,652 A * | 11/1998 | Koshimizu | G01L 19/003 | 73/756 |
| 5,939,637 A * | 8/1999 | Pitzer | G01L 19/142 | 73/715 |
| 6,070,469 A * | 6/2000 | Taniguchi | G01L 19/0038 | 73/720 |
| 6,155,119 A * | 12/2000 | Normann | B60C 23/04 | 73/756 |
| 6,354,153 B1 * | 3/2002 | Weiblen | G01D 11/245 | 73/756 |
| 6,363,779 B1 * | 4/2002 | Hochenberger | G01L 19/0007 | 73/114.37 |
| 6,439,058 B1 * | 8/2002 | Aratani | G01L 19/003 | 73/754 |
| 6,470,739 B1 * | 10/2002 | Matsumura | G01L 19/0007 | 73/114.37 |
| 6,493,237 B1 * | 12/2002 | Moody | G01L 19/14 | 257/727 |
| 7,553,071 B2 * | 6/2009 | Legl | G01D 11/245 | 374/142 |
| 7,992,622 B2 * | 8/2011 | Newman | F01P 11/08 | 165/140 |
| 7,997,141 B1 * | 8/2011 | Lo | G01L 19/148 | 73/706 |
| 8,132,529 B2 * | 3/2012 | Wells | B05C 5/0212 | 118/712 |
| 8,485,044 B2 * | 7/2013 | Delbos | G01J 5/0037 | 73/714 |
| 2003/0151126 A1 * | 8/2003 | Scheurich | G01L 19/003 | 257/682 |
| 2003/0230146 A1 | 12/2003 | Imai et al. | | |
| 2004/0083817 A1 * | 5/2004 | Nomura | G01D 11/245 | 73/756 |
| 2006/0043789 A1 * | 3/2006 | Dinkel | B60T 8/3675 | 303/119.3 |
| 2009/0218168 A1 * | 9/2009 | Diehl | F01M 11/0408 | 184/1.5 |
| 2010/0006052 A1 * | 1/2010 | Akiyama | F02D 9/104 | 123/184.56 |
| 2010/0186830 A1 | 7/2010 | Shigyo et al. | | |
| 2012/0285571 A1 * | 11/2012 | Kurth | F16L 41/008 | 138/104 |
| 2013/0056100 A1 * | 3/2013 | Imaizumi | B60T 13/662 | 137/560 |
| 2013/0098160 A1 * | 4/2013 | Rozgo | G01L 9/0041 | 73/723 |
| 2015/0137281 A1 * | 5/2015 | Imai | B81B 7/0051 | 257/415 |
| 2016/0053925 A1 * | 2/2016 | Dohi | G01L 19/145 | 285/337 |
| 2017/0122479 A1 * | 5/2017 | Yanagimoto | F02M 55/00 | |
| 2018/0057355 A1 * | 3/2018 | Osawa | B81B 7/0051 | |
| 2018/0087990 A1 * | 3/2018 | Osawa | G01L 19/0084 | |
| 2018/0087991 A1 * | 3/2018 | Osawa | G01L 19/0069 | |
| 2018/0251108 A1 * | 9/2018 | Yamaguchi | B60T 8/3645 | |

FOREIGN PATENT DOCUMENTS

| | | |
|---|---|---|
| JP | 2004-20216 A | 1/2004 |
| JP | 2010-174991 A | 8/2010 |

* cited by examiner

OIL PRESSURE SENSOR ATTACHMENT STRUCTURE

CROSS REFERENCE TO RELATED APPLICATIONS

This application claims the benefit of priority to Japanese Patent Application No. 2017-067249 filed on Mar. 30, 2017. The entire contents of this application are hereby incorporated herein by reference.

BACKGROUND OF THE INVENTION

1. Field of the Invention

The present invention relates to an oil pressure sensor attachment structure.

2. Description of the Related Art

An oil pressure control device including an oil pressure sensor is known.

For example, in Japanese Unexamined Patent Application Publication No. 2010-174991, an oil pressure sensor is attached to a control valve provided with an oil path.

As a method of attaching the oil pressure sensor to the control valve as described above, there is a method of attaching an oil pressure sensor from the outside of the control valve. As such a method, for example, there is a method in which a male thread portion is provided on the oil pressure sensor and the male thread portion of the oil pressure sensor is fastened from the outside of the control valve into the female thread hole provided in the control valve.

Here, in the oil pressure control device, since high pressure is applied from oil to be measured to the oil pressure sensor, it is necessary to sufficiently increase the attaching strength of the oil pressure sensor to the control valve. Accordingly, in a case where the method of fastening the male thread portion of the oil pressure sensor into the female thread hole of the control valve is used as described above, it is necessary to sufficiently lengthen the length of engagement between the thread portions, and the oil pressure sensor is likely to be large. Therefore, there is a problem that the oil pressure sensor increases size and the entire oil pressure control device is likely to increase size, so as to sufficiently secure the attaching strength of the oil pressure sensor.

The present invention is made in view of the above circumstances, and an object thereof is to provide an oil pressure sensor attachment structure that can suppress an increase in the size of the entire oil pressure control device while securing an attaching strength of an oil pressure sensor.

SUMMARY OF THE INVENTION

According to an aspect of the present invention, there is provided an oil pressure sensor attachment structure in which an oil pressure sensor for measuring a pressure of oil flowing in an oil path through which the oil flows is attached to an oil path body having the oil path therein, in which the oil path body has an oil path opening portion which is opened to the upper side of the oil path body and is connected to the oil path, the oil pressure sensor has a sensor main body, and a sensor case which covers the sensor main body, the sensor case has a sensing hole which is connected to the oil path opening portion on the lower surface of the sensor case in a state where the oil pressure sensor is attached to the oil path body, in which the oil pressure sensor attachment structure includes the oil path body; the sensor case; and a fixing member which fixes the sensor case to the oil path body, in which the sensor case has a columnar portion which is disposed along a central axis extending in an up and down direction, and a flange portion which protrudes from the columnar portion to an outside in a radial direction, the fixing member has a fixing portion which comes into contact with the oil path body and is fixed thereto, and a pressing portion which comes into contact with the upper surface of the flange portion and presses the flange portion against the oil path body, and the fixing portion and the pressing portion are disposed with an interval therebetween.

According to the aspect of the present invention, an oil pressure sensor attachment structure that can suppress an increase in the size of the entire oil pressure control device while ensuring the attaching strength of an oil pressure sensor is provided.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

The Z-axis direction appropriately indicated in each drawing is the up and down direction Z with the positive side as the upper side and the negative side as the lower side. The Y-axis direction is the left and right direction Y which is orthogonal to the Z-axis direction, with the positive side as the left side and the negative side on the right side. The X-axis direction is the front and rear direction X which is orthogonal to both the Z-axis direction and the Y-axis direction. The left and right direction Y corresponds to the first direction. In the following description, the upper side in the up and down direction is simply referred to as "upper side", and the lower side in the up and down direction is simply referred to as "lower side". In addition, the positive direction in the up and down direction Z is referred to as "upward", and the negative direction in up and down direction Z is referred to as "downward".

The up and down direction, upward, downward, the left and right direction, the front and rear direction, the upper side, the lower side, the left side and the right side are simply the names for explaining the relative positional relationship between the respective portions and an actual disposition relationship or the like may be a disposition relationship other than the disposition relationship indicated by these names or the like.

First, a first embodiment will be described.

Figure 1:
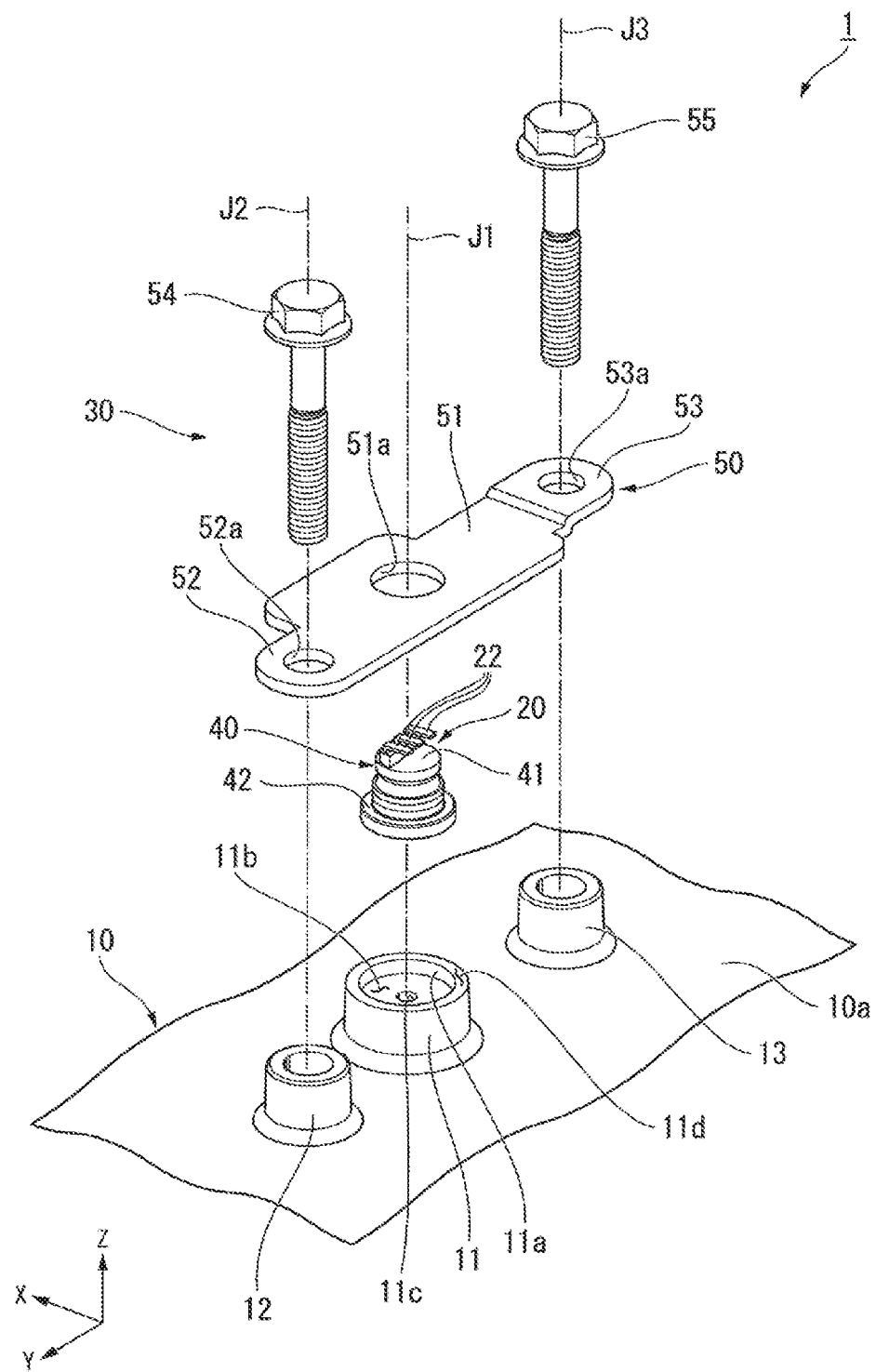
FIG. 1 is a perspective view showing an oil pressure sensor attachment structure of a first embodiment.
Figure 2:
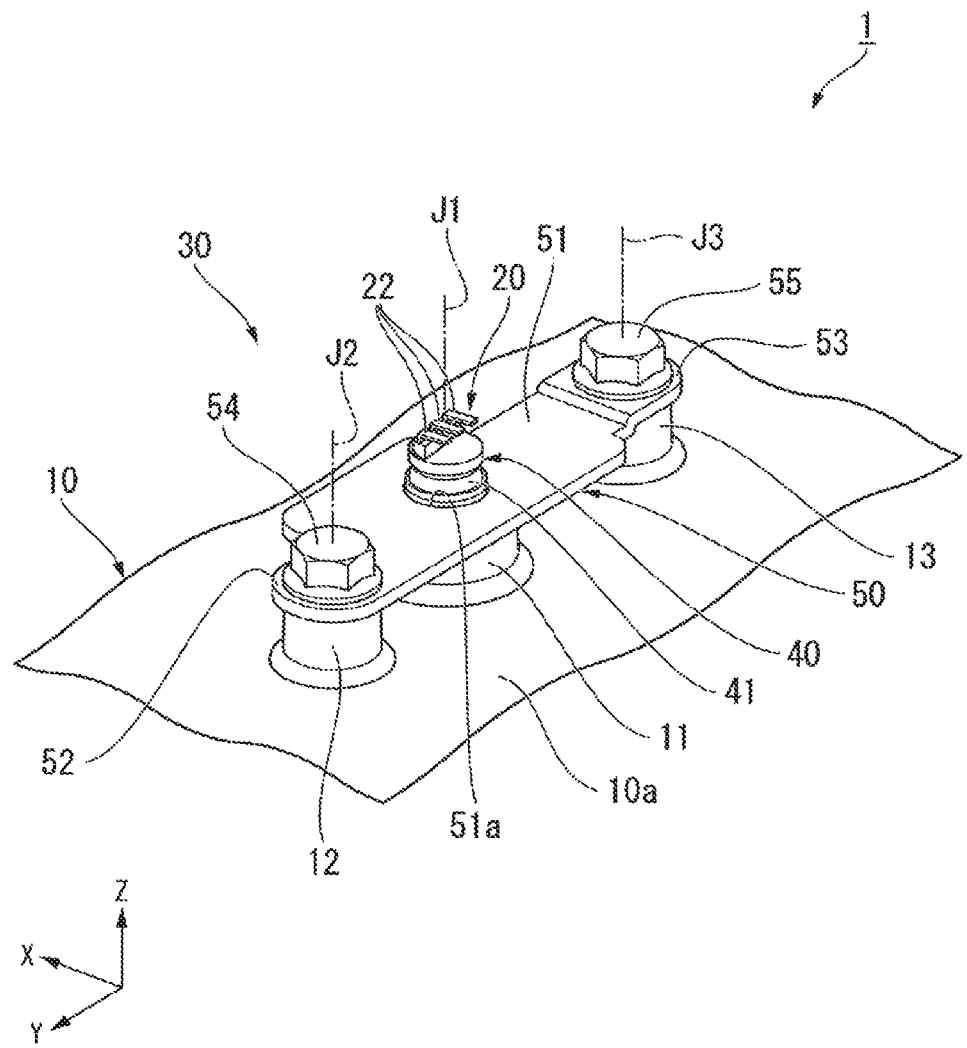
FIG. 2 is a perspective view showing the oil pressure sensor attachment structure of the first embodiment.
Figure 3:
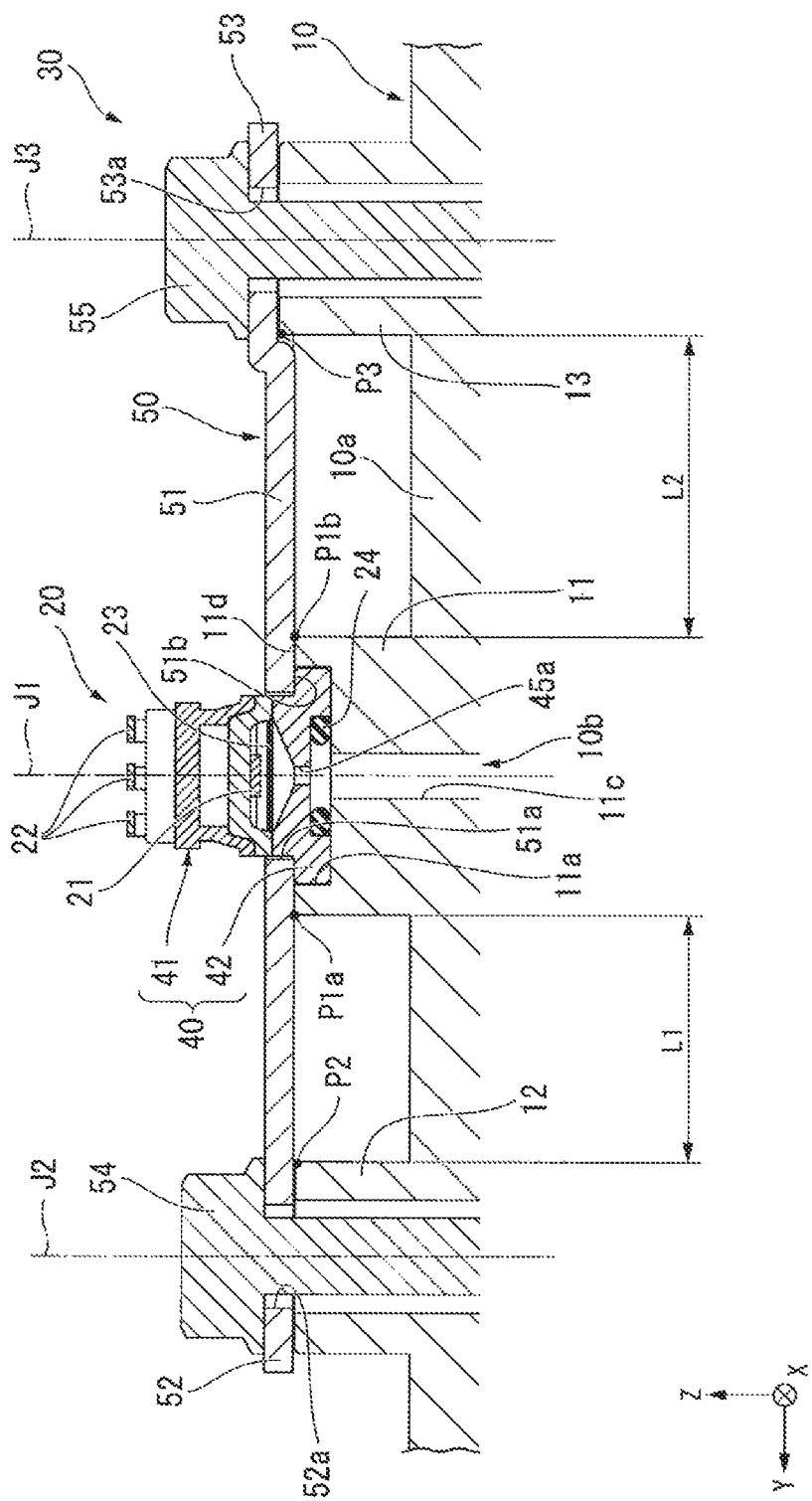
FIG. 3 is a cross-sectional view showing the oil pressure sensor attachment structure of the first embodiment.
Figure 4:
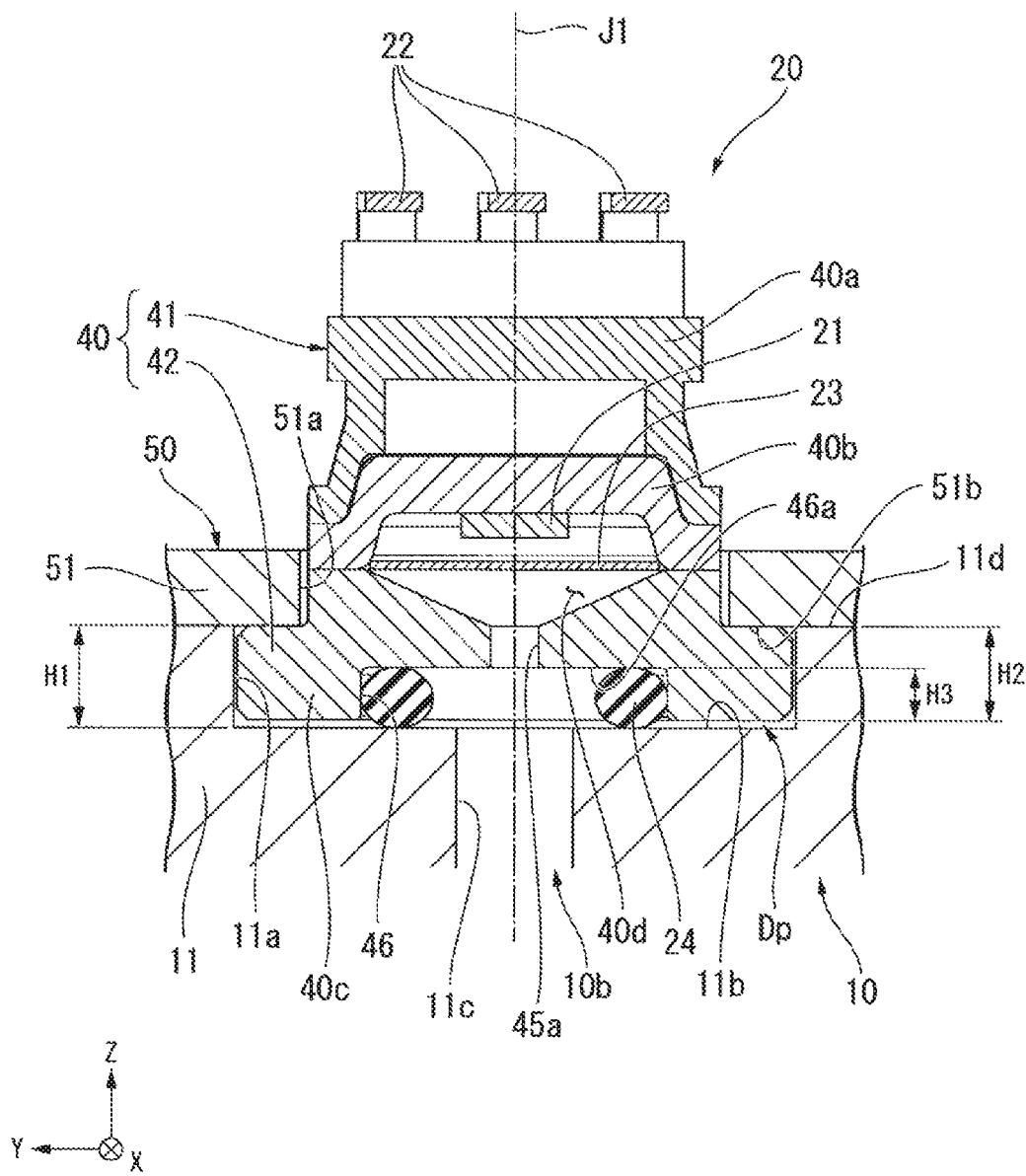
FIG. 4 is a cross-sectional view showing a portion of the oil pressure sensor attachment structure of the first embodiment.

In an oil pressure sensor attachment structure 30 of this embodiment shown in FIGS. 1 to 4, an oil pressure sensor 20 is attached to an oil path body 10 of a control valve in an oil pressure control device 1. FIG. 1 shows a state before the oil pressure sensor 20 is attached to the oil path body 10. FIGS. 2 to 4 show a state where the oil pressure sensor 20 is attached to the oil path body 10 by the oil pressure sensor attachment structure 30. A state where the oil pressure sensor 20 is attached to the oil path body 10 by the oil pressure sensor attachment structure 30 is referred to as "attached state". In the following description, in a case where there is no particular indication, the relative positional relationship between the portions is set to be the positional relationship in the attached state.

As shown in FIG. 3, the oil pressure sensor attachment structure 30 includes an oil path body 10, a sensor case 40 of the oil pressure sensor 20, a seal member 24, a fixing member 50, and threads 54 and 55. The oil path body 10 has an oil path 10b in which the oil flows therein. The oil pressure sensor 20 measures the pressure of the oil flowing in the oil path 10b. The oil path body 10 has an oil path body main body 10a in which an oil path 10b is provided, a protrusion portion 11, and fixed tubular portions 12 and 13.

As shown in FIG. 1, the protrusion portion 11 protrudes upward from the upper surface of the oil path body main body 10a. In the present embodiment, the protrusion portion 11 has a columnar shape about the central axis J1 extending in the up and down direction Z. In the following description, the radial direction about the central axis J1 is simply referred to as "radial direction", and the circumferential direction about the central axis J1 is simply referred to as "circumferential direction".

The protrusion portion 11 is provided with a recessed portion 11a recessed downward from the upper surface 11d of the protrusion portion 11. In other words, the oil path body 10 has a recessed portion 11a which is recessed downward. The outer shape of the recessed portion 11a viewed from the upper side is a circular shape about the central axis J1. An oil path opening portion 11c is provided on the bottom surface 11b of the recessed portion 11a. In other words, the oil path body 10 has an oil path opening portion 11c. The bottom surface 11b is a surface facing upward, and the oil path opening portion 11c provided in the bottom surface 11b is opened to the upper side of the oil path body 10. In the present embodiment, the oil path opening portion 11c has a circular shape about the central axis J1. As shown in FIG. 3, the oil path opening 11c is connected to the oil path 10b. The oil path opening portion 11c is an opening portion on the upper side of the oil path 10b extending in the up and down direction Z inside the protrusion portion 11.

As shown in FIG. 1, the fixed tubular portions 12 and 13 protrude upward from the upper surface of the oil path body main body 10a. In the present embodiment, the fixed tubular portion 12 has a cylindrical shape about a fixed axis J2 extending in the up and down direction Z. The fixed tubular portion 13 has a cylindrical shape about a fixed axis J3 extending in the up and down direction Z. The fixed axis J2 is disposed away from the left side of the central axis J1. The fixed axis J3 is disposed away from the right side of the central axis J1. In other words, the protrusion portion 11 is disposed between the fixed tubular portion 12 and the fixed tubular portion 13 in the left and right direction Y.

As shown in FIG. 3, an interval L1 between the fixed tubular portion 12 and the protrusion portion 11 in the left and right direction Y is smaller than the interval L2 between the fixed tubular portion 13 and the protrusion portion 11 in the left and right direction Y. The interval L1 is a distance between the right end point P2 at the upper end portion of the fixed tubular portion and the left endpoint P1a at the upper end portion of the protrusion portion 11 in the left and right direction Y. The interval L2 is a distance between the left endpoint P3 at the upper end portion of the fixed tubular portion 13 and the right endpoint P1b at the upper end portion of the protrusion portion 11 in the left and right direction Y. The upper end portion of the fixed tubular portion 12 is disposed at the same position as the upper end portion of the protrusion portion 11 in the up and down direction Z. Accordingly, the endpoints P1a and P1b and the end point P2 are disposed at the same position in the up and down direction Z. The upper end portion of the fixed tubular portion 13 is positioned above the upper end portion of the protrusion portion 11 and the upper end portion of the fixed tubular portion 12. Accordingly, the end point P3 is disposed above the end points P1a and P1b, and P2.

As shown in FIG. 4, the oil pressure sensor 20 has a sensor case 40, a sensor main body 21, and a diaphragm 23. The sensor case 40 covers the sensor main body 21. In the present embodiment, the sensor case 40 is installed on the bottom surface 11b of the recessed portion 11a. The sensor case 40 has a columnar portion 41 and a flange portion 42.

The columnar portion 41 is disposed along the central axis J1 extending in the up and down direction Z. As shown in FIG. 1, in this embodiment, the columnar portion 41 has a columnar shape. As shown in FIG. 4, the lower surface of the columnar portion 41 is a portion of the lower surface of the sensor case 40. A plurality of connection terminals 22 are provided on the upper end of the columnar portion 41. In the present embodiment, for example, three connection terminals 22 are provided. The columnar portion 41 has an accommodation recessed portion 46 that is recessed upward from the lower surface of the columnar portion 41, that is, the lower surface of the sensor case 40. In other words, the sensor case 40 has the accommodation recessed portion 46. In this embodiment, the outer shape viewed from the lower side of the accommodation recessed portion 46 is a circular shape about the central axis J1.

In the center of the accommodation recessed portion 46, a sensing hole 45a which is recessed upward from the top surface 46a of the accommodation recessed portion 46 and connected to an accommodation space 40d described below is provided. The top surface 46a of the accommodation recessed portion 46 is a surface that faces downward. In other words, the sensor case 40 has a sensing hole 45a on the lower surface of the sensor case 40. The sensing hole 45a is connected to the oil path opening portion 11c in a state where the oil pressure sensor 20 is attached to the oil path body 10. The inner diameter of the sensing hole 45a is smaller than the inner diameter of the oil path opening portion 11c.

The flange portion 42 protrudes radially outward from the columnar portion 41. In the present embodiment, the flange portion 42 is provided at the lower end portion of the columnar portion 41. The lower surface of the flange portion 42 is disposed on the same surface orthogonal to the up and down direction Z together with the lower surface of the columnar portion 41. The lower surface of the sensor case 40 is configured with the lower surface of the columnar portion 41 and the lower surface of the flange portion 42. The flange portion 42 has an annular shape surrounding the columnar portion 41 in the circumferential direction. The flange portion 42 is accommodated in the recessed portion 11a. Therefore, the radial movement of the flange portion 42 can be suppressed by the inner circumferential surface of the recessed portion 11a. Accordingly, the oil pressure sensor 20 can be positioned in the radial direction with respect to the oil path body 10, and the oil pressure sensor 20 can be stably attached to the oil path body 10. The outer diameter of the flange portion 42 is smaller than the inner diameter of the recessed portion 11a. Therefore, a gap is provided between the outer circumferential surface of the flange portion 42 and the inner circumferential surface of the recessed portion 11a.

The distance H1 between the opening edge portion on the upper side of the recessed portion 11a and the bottom surface 11b of the recessed portion 11a in the up and down direction Z is larger than the distance H2 between the upper surface of the flange portion 42 and the lower surface of the sensor case 40 in the up and down direction Z. In the present embodiment, the opening edge portion on the upper side of the recessed portion 11a is the upper surface 11d of the protrusion portion 11. The distance H1 corresponds to the dimension of the recessed portion 11a in the up and down direction Z. In this embodiment, since the lower surface of the sensor case 40 includes the lower surface of the flange portion 42, the distance H2 corresponds to the dimension of the flange portion 42 in the up and down direction Z.

In this embodiment, the sensor case 40 is configured with three members of an upper case 40a, a lid portion 40b, and a lower case 40c. The upper case 40a is a portion constituting the upper portion of the columnar portion 41. The upper case 40a is, for example, a single member made of resin. The lower case 40c is a portion constituting a lower portion of the columnar portion 41. The flange portion 42 is provided in the lower case 40c. The lower case 40c is, for example, a single metal member. The lid portion 40b is interposed in the up and down direction Z in a state of being in contact with the upper case 40a and the lower case 40c.

A storage space 40d is provided between the lower case 40c and the lid portion 40b in the up and down direction Z. The accommodation space 40d is partitioned in the up and down direction Z by the diaphragm 23. An upper end of the sensing hole 45a is opened in a lower portion of the accommodation space 40d. The sensor main body 21 is installed on the lower surface of the lid portion 40b in the upper portion of the accommodation space 40d. The upper portion of the accommodation space 40d is filled with a pressure transmitting liquid. In the attached state, oil flows into the lower portion of the accommodation space 40d via the sensing hole 45a connected to the oil path opening portion 11c. The pressure of the oil flowing into the lower portion of the accommodation space 40d is applied to the sensor body 21 via the diaphragm 23 and the pressure transmitting liquid. Accordingly, the oil pressure of the oil in the oil path 10b can be measured by the sensor main body 21.

The seal member 24 is accommodated in the accommodation recessed portion 46. In the present embodiment, the seal member is an O-ring. Therefore, the seal member 24 can be made inexpensive, and the manufacturing cost of the oil pressure control device 1 can be reduced. The seal member 24 seals between the oil path body 10 and the sensor case 40. More specifically, the seal member 24 seals between the portion of the upper surface of the oil path body 10 around the oil path opening portion 11c and the lower surface of the sensor case 40.

In the present specification, "upper surface of oil path body" is a surface in surfaces of the oil path body facing upward and exposed to the upper side of the oil path body in a state where no oil pressure sensor is attached. As shown in FIG. 1, in the present embodiment, the upper surface of the oil path body 10 includes an upper surface of an oil path body main body 10a, an upper surface 11d of the protrusion portion 11, a bottom surface 11b of the recessed portion 11a, and an upper surface of the fixed tubular portions 12 and 13.

In the present embodiment, the portion around the oil path opening portion 11c is a portion of the bottom surface 11b of the recessed portion 11a. In other words, as shown in FIG. 4, the seal member 24 of the present embodiment seals between the bottom surface 11b of the recessed portion 11a and the lower surface of the sensor case 40. Accordingly, leakage of the oil flowing into the accommodation space 40d from the oil path opening portion 11c from the recessed portion 11a to the outside of the oil path body 10 can be suppressed. The distance H3 between the lower surface of the sensor case 40 and the top surface 46a of the accommodation recessed portion 46 in the up and down direction Z is smaller than the dimension of the seal member 24 in a state of not being deformed state in the up and down direction Z. The distance H3 corresponds to the dimension of the accommodation recessed portion 46 in the up and down direction Z.

In this specification, "a state where the seal member is not deformed" includes, for example, a state before the seal member is mounted on the oil pressure sensor, a state of the seal member when the seal member is mounted on the oil pressure sensor and the oil pressure sensor is not attached to the oil path body. In other words, the dimension of the seal member 24 in a state of not being deformed state in the up and down direction Z includes the dimension of the seal member 24 in the up and down direction Z in a state where the seal member 24 is fitted in the accommodation recessed portion 46 and attached to the oil pressure sensor 20 before the oil pressure sensor 20 is attached to the oil path body 10.

The seal member 24 protrudes downward from the lower surface of the sensor case 40 in a state where the seal member 24 is fitted into the accommodation recessed portion 46 before the oil pressure sensor 20 is attached to the oil path body 10. Therefore, in the attached state, the seal member 24 comes into contact with the bottom surface 11b. The seal member 24 is interposed in the up and down direction Z in a state of being in contact with a portion between the bottom surface 11b of the recessed portion 11a and the top surface 46a of the accommodation recessed portion 46 and elastically compressed and deformed in the up and down direction Z.

The fixing member 50 is a member for fixing the sensor case 40 to the oil path body 10. As shown in FIG. 1, the fixing member 50 has a plate shape that expands along a surface intersecting the up and down direction Z. In the present embodiment, the upper surface and the lower surface of the fixing member 50 are orthogonal to the up and down direction Z. The fixing member 50 extends in the left and right direction Y orthogonal to the up and down direction Z. The shape of the fixing member 50 viewed from above is a substantially rectangular shape long in the horizontal direction Y. The fixing member 50 has a main body portion 51 and fixing portions 52 and 53.

The main body portion 51 extends in the left and right direction Y. The main body portion 51 has a through-hole 51a that passes through the main body portion 51 in the up and down direction Z. In other words, the fixing member 50 has a through-hole 51a. As shown in FIGS. 2 to 4, the columnar portion 41 passes through the through-hole 51a in the up and down direction Z so as to pass therethrough. In the present embodiment, the through-hole 51a has a circular shape about the central axis J1. As shown in FIG. 4, the inner diameter of the through-hole 51a is larger than the outer diameter of the columnar portion 41 and smaller than the outer diameter of the flange portion 42. A gap is provided between the inner circumferential surface of the through-hole 51a and the outer circumferential surface of the columnar portion 41 in the radial direction.

In the present embodiment, the opening edge portion on the lower side of the through-hole 51a in the main body portion 51 is a pressing portion 51b which comes into contact with the upper surface of the flange portion 42. In other words, the fixing member 50 has a pressing portion 51b. The pressing portion 51b applies a downward force to the flange portion 42 to press the flange portion 42 against the oil path body 10. In the present embodiment, the pressing portion 51b presses the flange portion 42 against the bottom surface 11b of the recessed portion 11a.

As shown in FIG. 1, the fixing portion 52 is connected to the left end portion of the main body portion 51. The upper surface of the fixing portion 52 is disposed on the same surface orthogonal to the upper surface of the main body portion 51 in the up and down direction Z. The lower surface of the fixing portion 52 is disposed on the same surface orthogonal to the lower surface of the main body portion 51 in the up and down direction Z. The fixing portion 52 has a fixing hole portion 52a passing the fixing portion 52 in the up and down direction Z. The fixing hole portion 52a has a circular shape about the fixed axis J2. As shown in FIG. 3, the fixing portion 52 comes into contact with the upper surface of the fixed tubular portion 12. The fixing portion 52 is fixed to the fixed tubular portion 12 by inserting a thread 54 passing through the fixing hole portion 52a from the upper side into the inside of the fixed tubular portion 12 and being fastened into a female thread portion (not shown). Accordingly, the fixing portion 52 is fixed in contact with the oil path body 10.

As shown in FIG. 1, the fixing portion 53 is connected to the right end portion of the main body portion 51. The fixing portion 53 is disposed above the main body portion 51. In other words, the upper surface of the fixing portion 53 is located above the upper surface of the main body portion 51. The lower surface of the fixing portion 53 is located above the lower surface of the main body portion 51. The fixing portion 53 has a fixing hole portion 53a passing the fixing portion 53 in the up and down direction Z. The fixing hole portion 53a has a circular shape about the fixed axis J3. As shown in FIG. 3, the fixing portion 53 comes into contacts with the upper surface of the fixed tubular portion 13. The fixing portion 53 is fixed to the fixed tubular portion 13 by inserting a thread 55 passing through the fixing hole portion 53a from the upper side into the inside of the fixed tubular portion 13 and being fastened into a female thread portion (not shown). Accordingly, the fixing portion 53 is fixed in contact with the oil path body 10.

First, an installer inserts the flange portion 42 into the recessed portion 11a, and installs the oil pressure sensor 20 on the bottom surface 11b of the recessed portion 11a. In this state, the upper surface of the flange portion 42 is positioned above the upper surface 11d of the protrusion portion 11.

Next, as shown in FIG. 1, the installer brings the fixing member 50 closer from the upper side of the oil pressure sensor 20, and passes the columnar portion 41 through the through-hole 51a. Then, the fixing member 50 is installed on the oil path body 10 in a posture in which the fixing portion 52 overlaps the fixed tubular portion 12 in the up and down direction Z and the fixing portion overlaps the fixed tubular portion 13 in the up and down direction Z. At this time, the opening edge on the lower side of the through-hole 51a as the pressing portion 51b is in a state of being in contact with the upper surface of the flange portion 42.

Next, the installer inserts the threads 54 and 55 from the upper side of the fixing member 50 through the fixing hole portions 52a and 53a into the inside of the fixed tubular portions 12 and 13. Then, the installer fastens the threads 54 and 55 into the female thread portion (not shown) of the oil path body 10, and fixes the fixing portions 52 and 53 to the fixed tubular portions 12 and 13. By fastening the threads 54 and 55, the fixing portions 52 and 53 are pressed against the upper surfaces of the fixed tubular portions 12 and 13 and fixed. Accordingly, a force in a direction in which the main body portion 51 is pressed against the protrusion portion 11, that is, a downward force in the present embodiment is applied to the main body portion 51. Therefore, as the threads 54 and 55 are fastened, the main body portion 51 moves downward, and the flange portion 42 is pushed downward by the pressing portion 51b. Therefore, the flange portion 42 is pushed into the recessed portion 11a against the elastic force of the seal member 24. At this time, as the flange portion 42 is pushed into the recessed portion 11a, the seal member 24 is elastically compressed and deformed in the up and down direction Z.

In the present embodiment, as described above, the distance H1 between the opening edge portion on the upper side of the recessed portion 11a and the bottom surface 11b of the recessed portion 11a in the up and down direction Z is greater than the distance H2 between the upper surface of the flange portion 42 and the lower surface of the sensor case 40 in the up and down direction Z. Therefore, as shown in FIG. 4, before the lower surface of the sensor case 40 comes into contact with the bottom surface 11b, the main body portion 51 comes into contact with the upper side of the opening edge portion of the recessed portion 11a, that is, the upper surface 11d of the protrusion portion 11 and the downward movement of the main body portion 51 is blocked. Accordingly, the pressing portion 51b is fixed in a state of being in contact with both the upper surface of the flange portion 42 and the upper surface 11d of the protrusion portion 11 and the upper surface of the flange portion 42 of the oil pressure sensor 20 is fixed to the oil path body 10 in a state of being pushed to the position in the up and down direction Z such as the upper surface 11d by the pressing portion 51b. As described above, the oil pressure sensor 20 is attached to the oil path body 10 by the oil pressure sensor attachment structure 30.

In the attached state, since the seal member 24 is elastically compressed and deformed, the oil pressure sensor 20 receives an upward force from the seal member 24. Accordingly, the flange portion 42 is pressed from the lower side to the pressing portion 51b by the seal member 24. Here, in the present embodiment, the distance H2 corresponding to the dimension of the flange portion 42 in the up and down direction Z is smaller than the distance H1 corresponding to the dimension of the recessed portion 11a in the up and down direction Z. Therefore, the flange portion 42 is pushed up by the seal member 24 to be separated upward from the bottom surface 11b. Accordingly, a gap Dp is provided between the lower surface and the bottom surface 11b of the sensor case 40 in the up and down direction Z in the attached state.

According to the present embodiment, since the fixing member 50 has the pressing portion 51b for pressing the flange portion 42 against the oil path body 10, the oil pressure sensor 20 can be fixed to the oil path body 10 without providing the male thread portion to an oil pressure sensor 20. Accordingly, the oil pressure sensor 20 can decrease size in the up and down direction Z. In addition, since the pressing portion 51b comes into contact with the upper surface of the flange portion 42, the upward movement of the flange portion 42 is suppressed. Accordingly, even in a case where an upward high pressure is applied to the oil pressure sensor 20 by the oil pressure of the oil from the oil path opening portion 11c, detachment of the oil pressure sensor 20 from the oil path body 10 can be suppressed. Therefore, according to the present embodiment, the oil pressure sensor attachment structure 30 is obtained that can suppress increase in size of the overall oil pressure control device 1 while securing the attaching strength of the oil pressure sensor 20.

In addition, the sensor main body 21 is likely to be provided inside the columnar portion 41 as in this embodiment. Therefore, for example, there are a case where the columnar portion 41 is directly pressed against the oil path body 10 by the fixing member and a case where the sensor main body 21 is distorted by the force applied to the columnar portion 41 and the detection accuracy of the oil pressure sensor is deteriorated.

On the other hand, according to the present embodiment, the pressing portion 51b presses the flange portion 42 against the oil path body 10. Therefore, even if a relatively large force is applied to the oil pressure sensor 20 by the pressing portion 51b, distortion of the sensor main body 21 can be suppressed. Therefore, it is possible to firmly fix the oil pressure sensor 20 to the oil path body 10 by the pressing portion 51b while suppressing deterioration of detection accuracy by the oil pressure sensor 20.

In addition, for example, when the oil in the oil path 10b vibrates, the vibration of the oil is transmitted to the oil pressure sensor. At this time, if the vibration frequency of the oil is equal to or close to the natural frequency of the oil pressure sensor, there is a case where the oil pressure sensor greatly vibrates due to the resonance, and the attached state of the oil pressure sensor becomes unstable.

On the other hand, according to the present embodiment, the oil pressure sensor 20 is pressed against the oil path body 10 by the fixing member 50. Therefore, for example, when the natural frequency of the fixing member 50 changes in the attached state, the natural frequency of the oil pressure sensor 20 changes in the attached state. In the present embodiment, in the fixing member 50, the fixing portions 52 and 53, and the pressing portion 51b are disposed with an interval therebetween. Therefore, by changing the interval between the fixing portions 52 and 53 and the pressing portion 51b, or by changing the thickness of the fixing member 50 at the portion between the fixing portions 52 and 53 and the pressing portion 51b, the natural frequency of the fixing member 50 can be changed in the attached state. Accordingly, by changing the fixing member 50, it is possible to easily change the natural frequency of the oil pressure sensor 20 in the attached state. Therefore, according to the present embodiment, it is possible to suppress resonance of the oil pressure sensor 20 due to vibration of the vehicle body and vibration caused by rotation of the engine, and it is possible to suppress the attaching state of the oil pressure sensor 20 from becoming unstable.

In the present embodiment, the pressing portion 51b presses the flange portion 42 accommodated in the recessed portion 11a provided in the protrusion portion 11. Therefore, the portion between the pressing portion 51b and the fixing portions 52 and 53 of the fixing member 50 is likely to be in a state of being bridged between the portions where the position in the up and down direction Z becomes relatively an upper side. As shown in FIG. 3, specifically, for example, a portion between the pressing portion 51b and the fixing portion 52 of the fixing member 50 is in a state of being bridged between the protrusion portion 11 and the fixed tubular portion 12. A portion between the pressing portion 51b and the fixing portion 53 of the fixing member 50 is bridged between the protrusion portion 11 and the fixed tubular portion 13.

Accordingly, according to the present embodiment, by changing dimensions of the portion bridged between the protrusion portion 11 and the fixed tubular portion 12 in the fixing member 50 and the portion bridged between the protrusion portion 11 and the fixed tubular portion 13 in the fixing member 50, the natural frequency of the fixing member 50 in the attached state can be easily changed.

The portion of the fixing member 50 which is bridged between the protrusion portion 11 and the fixed tubular portion 12 is the portion of the fixing member 50 positioned between the endpoint P1a and the end point P2 in the left and right direction Y. The portion of the fixing member 50 which is stretched over the protrusion portion 11 and the fixed tubular portion 13 is a portion of the fixing member 50 positioned between the endpoint P1b and the end point P3 in the left and right direction Y. Therefore, for example, if the intervals L1 and L2 become large, the natural frequency of the oil pressure sensor 20 in the attached state is likely to be made relatively low, and if the intervals L1 and L2 are reduced, the natural vibration of the fixing member 50 in the attached state is likely to be relatively high.

In addition, the natural frequency of the fixing member 50 in the attached state is also changed according to the size of the fastening force by the threads 54 and 55. Therefore, by changing the degree of fastening of the threads 54 and 55 with respect to the oil path body 10, it is possible to easily change the natural frequency of the oil pressure sensor 20 in the attached state. Specifically, in a case of fastening the threads 54 and 55 relatively strongly with respect to the oil path body 10, the fastening force by the threads 54 and 55 becomes relatively large, and the natural frequency of the fixing member 50 in the attached state is likely to become relatively large. Therefore, the natural frequency of the oil pressure sensor 20 in the attached state is likely to become relatively large.

On the other hand, in a case of fastening the threads 54 and 55 relatively weakly with respect to the oil path body 10, the fastening force by the threads 54 and 55 becomes relatively small, and the natural frequency of the fixing member 50 in the attached state is likely to become relatively small. Therefore, the natural frequency of the oil pressure sensor 20 in the attached state is likely to become relatively small.

In addition, according to the present embodiment, the seal member 24 elastically compressed and deformed in the up and down direction Z in a state where the pressing portion 51b is in a state of being in contact with the upper surface 11d which is the opening edge portion on the upper side of the recessed portion 11a. Therefore, the seal member 24 can come into close contact with the bottom surface 11b of the recessed portion 11a and the top surface 46a of the accommodation recessed portion 46. Accordingly, it is possible to seal the oil path body 10 and the sensor case 40 more accurately by the seal member 24.

In addition, according to the present embodiment, as described above, since the distance H1 is larger than the distance H2, even when the flange portion 42 is pressed by the pressing portion 51b, in a state where the pressing portion 51b is in contact with the upper surface of the flange portion 42, the lower surface of the sensor case 40 does not come into contact with the bottom surface 11b of the recessed portion 11a. Therefore, excessive crushing and damage of the seal member 24 disposed between the bottom surface 11b and the lower surface of the sensor case 40 can be suppressed. In addition, by adjusting the distances H1 and H2, the amount of elastic compression deformation of the seal member 24 in the attached state can be adjusted. Accordingly, the seal member 24 is preferably elastically compressed and deformed, so that the sealing by the seal member 24 can be more preferably performed.

For example, when the oil pressure sensor 20 is pushed upward by the pressure of the oil flowing into the accommodation space 40d from the oil path opening portion 11c, there is a case where the fixing member 50 is elastically deformed and the pressing portion 51b is lifted away from the upper surface 11d of the protrusion portion 11 upward. In this case, since the entire oil pressure sensor 20 moves upward, the seal member 24 which is elastically compressed and deformed is restored and deformed. On the other hand, according to the present embodiment, for example, by adjusting the distances H1 and H2, even if the pressing portion 51b is lifted and the seal member 24 is restored and deformed, the amount of elastic compression deformation of the seal member 24 can be adjusted so that the amount of elastic compression deformation of the seal member 24 is kept to such an extent that the portion between the oil path body 10 and the sensor case 40 can be sealed or more. Therefore, even if the oil pressure sensor is lifted by the oil, leakage of oil can be preferably suppressed.

In addition, according to the present embodiment, the pressing portion 51b includes the opening edge portion on the lower side of the through-hole 51a. Therefore, the flange portion 42 can be pushed over the entire circumferential direction with a simple configuration, and the oil pressure sensor 20 can be more stably attached to the oil path body 10. In addition, by passing the columnar portion 41 through the through-hole 51a, the connection terminal 22 provided at the upper end of the columnar portion 41 can be exposed, and the power supply or the like is likely to be electrically connected to the connection terminal 22.

In addition, according to the present embodiment, the fixing portions 52 and 53 are provided at at least one end portion of the fixing member 50 extending in the left and right direction Y in the left and right direction. Therefore, by changing the dimension of the fixing member 50 in the left and right direction Y, as described above, the natural frequency of the oil pressure sensor 20 in the attached state is likely to be adjusted. In the present embodiment, the fixing portions 52 and 53 are provided at the end portions on both sides of the fixing member 50 in the left and right direction. Therefore, the oil pressure sensor 20 is likely to be more stably fixed to the oil path body 10 by the fixing member 50.

In addition, according to the present embodiment, the fixing member 50 is in a shape of a plate that expands along the surface that intersects the up and down direction Z. Therefore, it is possible to make the fixing member 50 thin in the up and down direction Z, and it is possible to further suppress the increase in the size of the oil pressure control device 1 in the up and down direction Z.

The present invention is not limited to the embodiment described above, and other configurations can be adopted. In the following explanation, the same reference numerals are attached to the same configurations as those in the embodiment described above, and the explanation may be omitted in some cases.

The recessed portion 11a may not be provided. In this case, for example, the oil pressure sensor 20 is pressed by the pressing portion 51b until the lower surface of the sensor case 40 comes into contact with the upper surface of the oil path body 10. Here, since the distance H3 corresponding to the dimension of the accommodation recessed portion 46 in the up and down direction Z is smaller than the dimension of the seal member 24 in a state of not being deformed state in the up and down direction Z, in a state where the pressing portion 51b is in contact with the upper surface of the flange portion 42, the seal member 24 is elastically compressed and deformed in the up and down direction Z. In a state where the lower surface of the sensor case 40 is in contact with the upper surface of the oil path body 10, the oil pressure sensor does not move downward even if the oil pressure sensor is pressed by the pressing portion 51b. Therefore, the amount of elastic compression deformation of the seal member 24 is only the difference between the dimension of the seal member 24 in a state of not being deformed state in the up and down direction Z and the distance H3. Therefore, even in a state where the recessed portion 11a is not provided, the amount of elastic compression deformation of the seal member 24 can be adjusted by adjusting the distance H3 corresponding to the dimension of the accommodation recessed portion 46 in the up and down direction Z. Accordingly, excessive crushing and damage of the seal member 24 can be suppressed.

In addition, the protrusion portion 11 and the fixed tubular portions 12 and 13 may not be provided. In this case, for example, a hole into which the recessed portion 11a and the threads 54 and 55 are inserted may be provided on the upper surface of the oil path body main body 10a. In addition, the fixing member 50 may not have the through-hole 51a. In addition, the fixing member 50 may have three or more fixing portions. The shape of the fixing member is not particularly limited as long as the fixing member can fix the oil pressure sensor 20 with the pressing portion and the fixing portion.

In addition, the oil path opening portion 11c may not be positioned at a position where the central axis J1 passes if the oil path opening portion is connected to the sensing hole 45a in the attached state. In other words, in the embodiment described above, the positions of the oil path opening portion 11c and the sensing hole 45a may be deviated from the central axis J1. In addition, the sensor case 40 may be a single member. In addition, the flange portion 42 may not be also annular as long as the flange portion protrudes radially outward from the columnar portion 41. The flange portion 42 may not be provided in a portion thereof in the circumferential direction. In addition, a plurality of flange portions 42 may be provided discretely along the circumferential direction.

Next, a second embodiment will be described.

Figure 5:
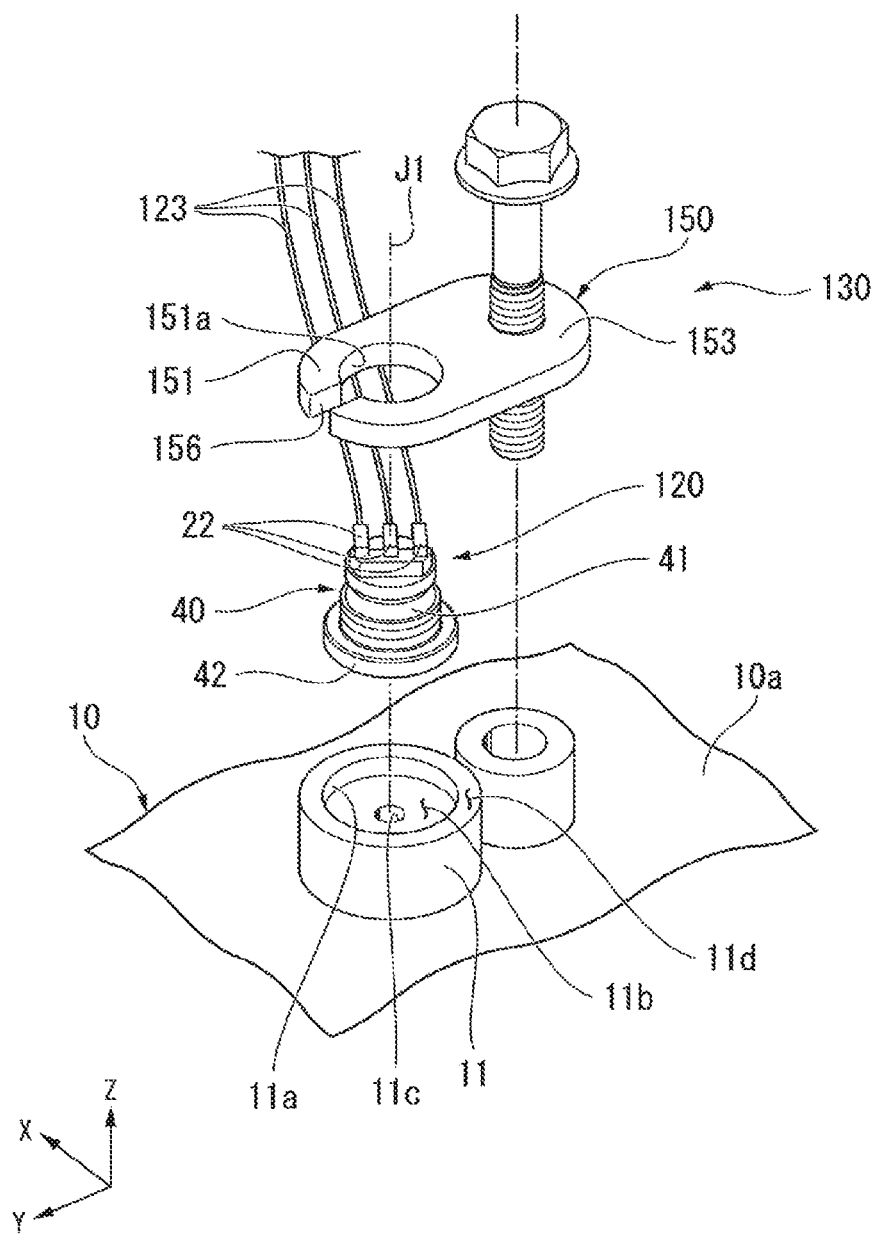
FIG. 5 is a perspective view showing an oil pressure sensor attachment structure of a second embodiment.
Figure 6:
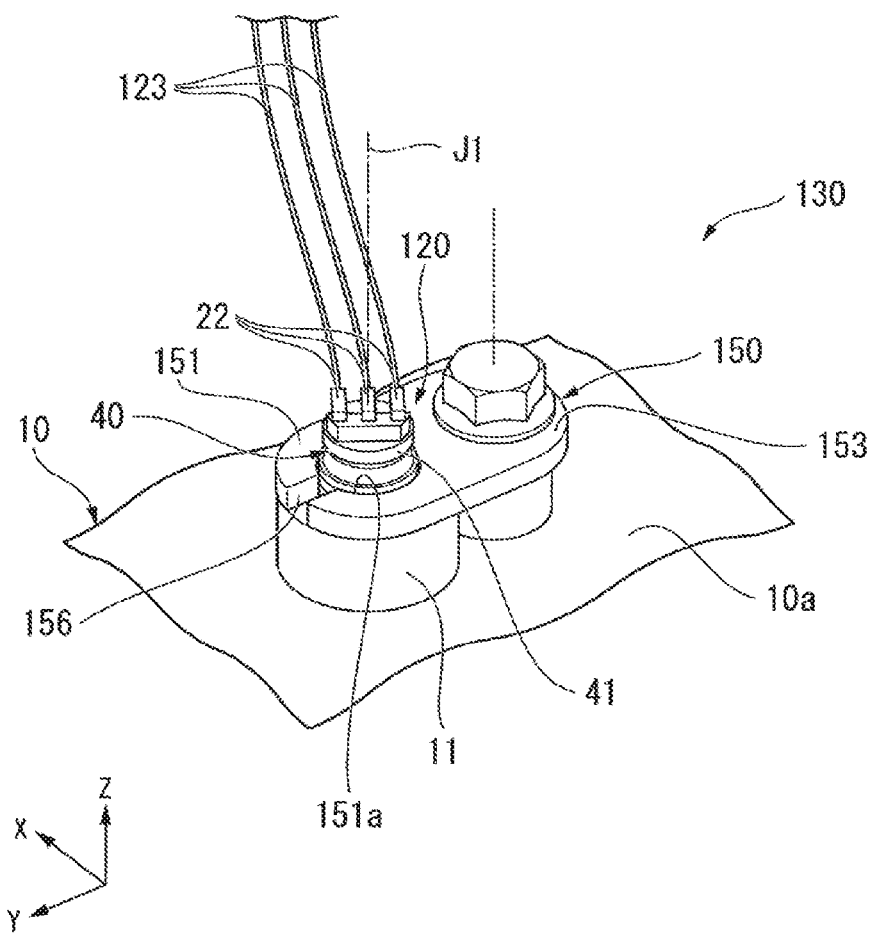
FIG. 6 is a perspective view showing the oil pressure sensor attachment structure of the second embodiment.

FIG. 5 shows a state before the oil pressure sensor 120 of this embodiment is attached to the oil path body 10. FIG. 6 shows a state where the oil pressure sensor 120 is attached to the oil path body 10 by the oil pressure sensor attachment structure 130 of the present embodiment. As shown in FIG. 5 and FIG. 6, the oil pressure sensor 120 of the present embodiment has the wiring 123 connected to each of the connection terminals 22. The wiring 123 is electrically connected to, for example, a power supply (not shown) or the like.

The fixing member 150 of the present embodiment has a plate shape orthogonal to the up and down direction Z. The shape of the fixing member 150 as viewed from the upper side is a rounded rectangular shape long in the left and right direction Y. The main body portion 151 is the left side portion of the fixing member 150. The main body portion 151 has a slit 156. In other words, the fixing member 150 has a slit 156. The slit 156 extends from the outer edge of the fixing member 150 to the through-hole 151a when viewed from the upper side. Accordingly, a portion of the circumferential edge portion of the through-hole 151a is divided in the circumferential direction. The slit 156 passes through from the left end portion of the inner circumferential surface of the through-hole 151a to the left end portion in the outer circumferential surface in the fixing member 150 in the left and right direction Y.

According to the present embodiment, by passing the wiring 123 through the slit 156, even in a state where the wiring 123 is connected to a power supply or the like, the columnar portion 41 and the wiring 123 pass through the through-hole 151a and the oil pressure sensor 120 can be fixed to the oil path body 10. Accordingly, the degree of freedom of the assembling procedure of the oil pressure control device can be improved.

The fixing portion 153 is the right side portion of the fixing member 150. In the present embodiment, the fixing portion 153 is provided only at one end portion of the fixing member 150 in the left and right direction.

Subsequently, a third embodiment will be described.

Figure 7:
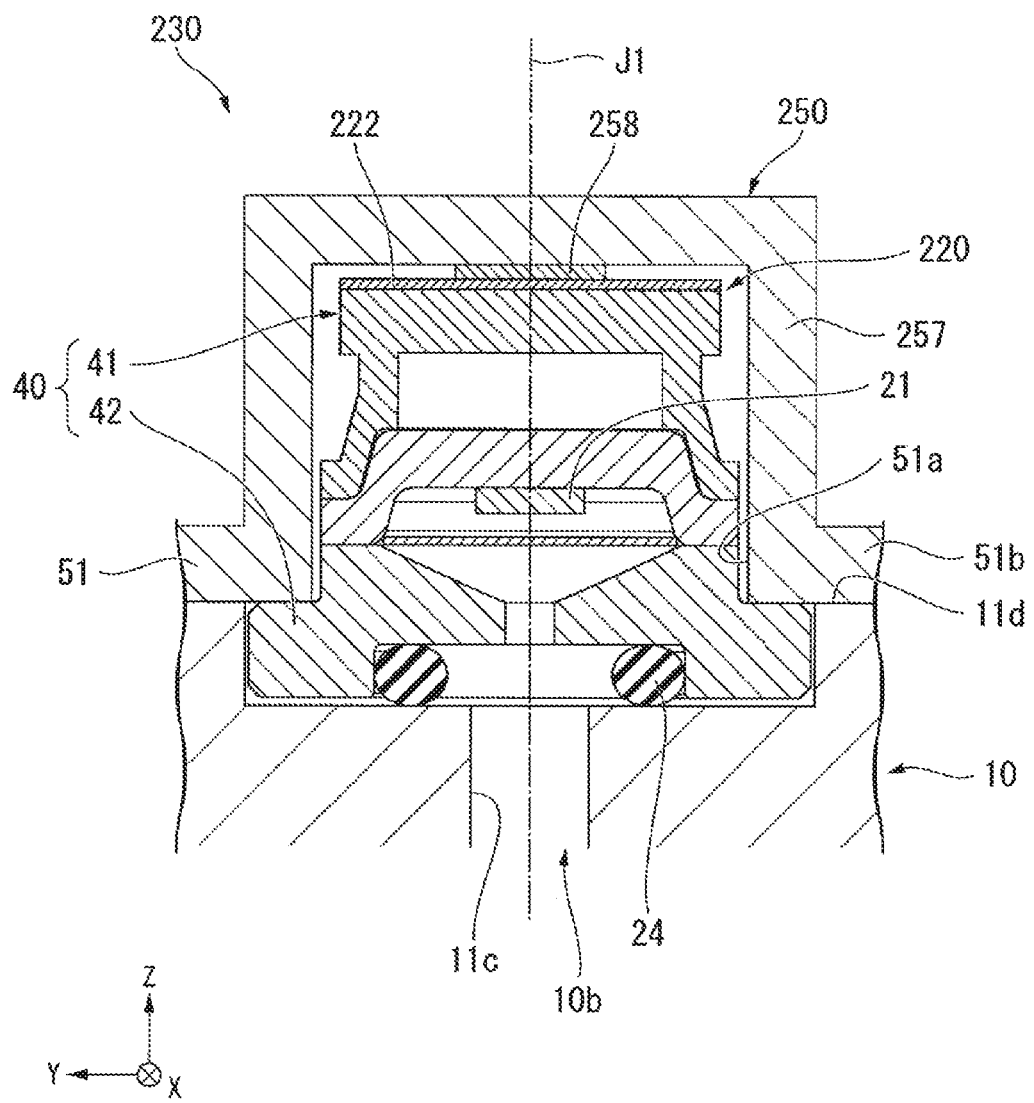
FIG. 7 is a cross-sectional view showing a portion of an oil pressure sensor attachment structure of a third embodiment.

As shown in FIG. 7, in the oil pressure sensor attachment structure 230 of the present embodiment, the fixing member 250 has a connection tubular portion 257. The connection tubular portion 257 is a lidded cylindrical shape extending upward from the circumferential edge portion of the through-hole 51a. The columnar portion 41 is accommodated in the connection tubular portion 257. A terminal portion 258 is provided on the lower surface of the lid portion of the connection tubular portion 257. In other words, the fixing member 250 has a terminal portion 258. The oil pressure sensor 220 has an electrode portion 222 on the upper-end surface of the columnar portion 41. The electrode portion 222 is exposed to the outside of the sensor case 40. Although not shown, the electrode portion 222 is electrically connected to the sensor main body 21.

The terminal portion 258 comes into contact with the electrode portion 222 in a state where the oil pressure sensor 220 is attached to the oil path body 10. Therefore, by attaching the oil pressure sensor 220 to the oil path body 10 by the oil pressure sensor attachment structure 230 including the fixing member 250, the terminal portion 258 of the fixing member 250 can be electrically connected to the oil pressure sensor 220. Therefore, it is possible to reduce the time and the labor of performing electrical wiring to the oil pressure sensor 220.

Finally, a fourth embodiment will be described.

Figure 8:
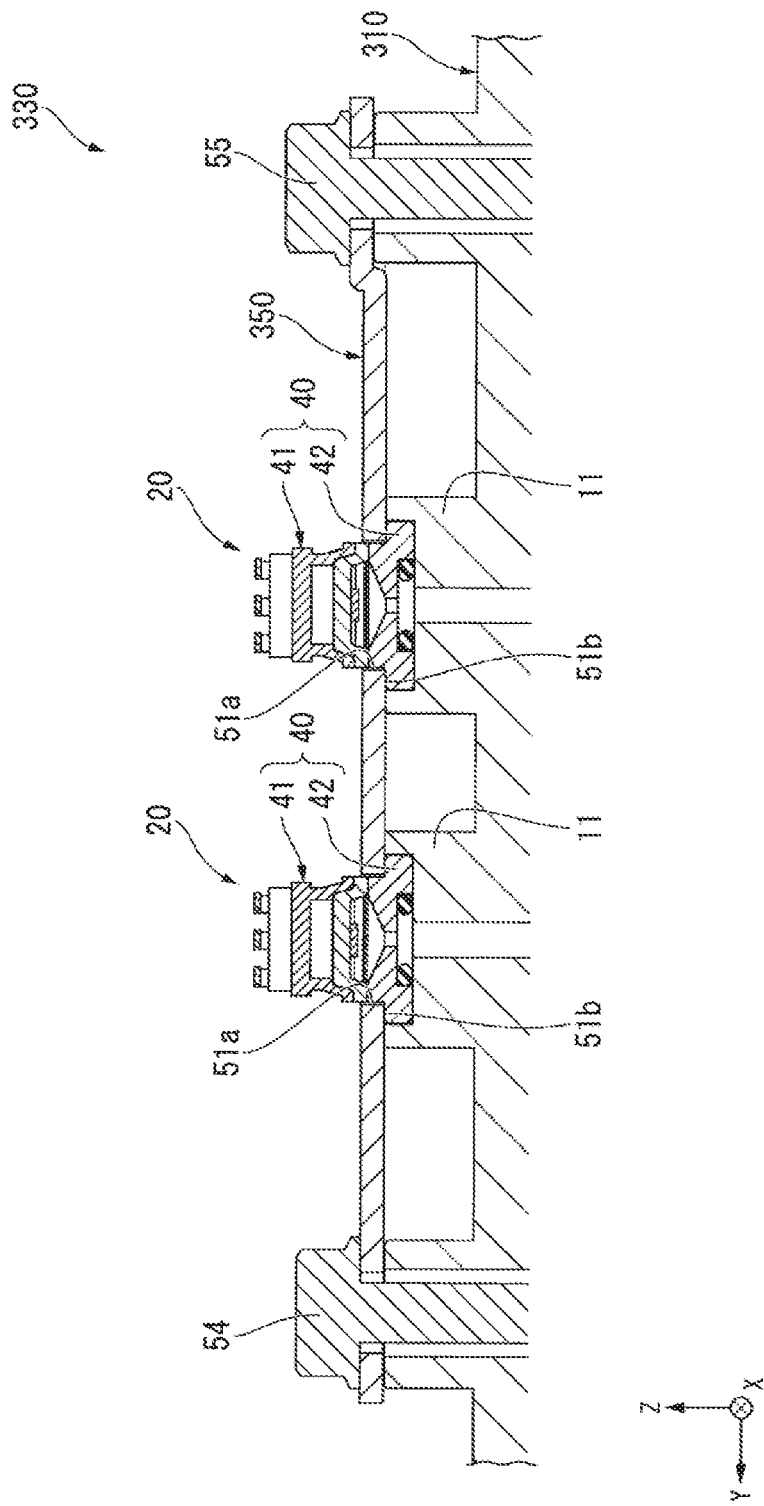
FIG. 8 is a cross-sectional view showing an oil pressure sensor attachment structure of a fourth embodiment.

As shown in FIG. 8, in the present embodiment, a plurality of oil pressure sensors 20 are provided. In FIG. 8, for example, two oil pressure sensors 20 are provided. In the oil pressure sensor attachment structure 330 of the present embodiment, the fixing member 350 has a plurality of pressing portions 51b. In FIG. 8, for example, two pressing portions 51b are provided. Each of the plurality of pressing portions 51b comes into contact with the upper surface of the flange portion 42 with respect to each of the plurality of oil pressure sensors 20 and presses the flange portion 42 against the oil path body 310. Therefore, according to the present embodiment, the plurality of oil pressure sensors 20 can be attached to the oil path body 310 by one fixing member 350. Three or more oil pressure sensors 20 may be fixed to the oil path body 310 by one fixing member 350.

In addition, the oil path body to which the oil pressure sensor can be attached by the oil pressure sensor attachment structure of each the embodiments described above is not particularly limited as long as the oil path body has an oil path through which the oil flows therein. For example, the oil pressure sensor attachment structure of the embodiment described above may be applied to an attachment structure of an oil pressure sensor with respect to an electric oil pump.

Each of the configurations described above can be appropriately combined within a range not inconsistent with each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An oil pressure sensor attachment structure in which an oil pressure sensor for measuring a pressure of oil flowing in an oil path through which the oil flows is attached to an oil path body having the oil path therein,
   wherein the oil path body has an oil path opening portion which is opened to the upper side of the oil path body and is connected to the oil path,
   wherein the oil pressure sensor has a sensor main body, and a sensor case which covers the sensor main body,
   wherein the sensor case has a sensing hole which is connected to the oil path opening portion on the lower surface of the sensor case in a state where the oil pressure sensor is attached to the oil path body,
   wherein the oil pressure sensor attachment structure comprises:
      the oil path body;
      the sensor case; and
      a fixing member which fixes the sensor case to the oil path body,
   wherein the sensor case has
      a columnar portion which is disposed along a central axis extending in an up and down direction, and
      a flange portion which protrudes from the columnar portion to an outside in a radial direction,
   wherein the fixing member has
      a fixing portion which comes into contact with the oil path body and is fixed thereto, and
      a pressing portion which comes into contact with the upper surface of the flange portion and presses the flange portion against the oil path body, and
   wherein the fixing portion and the pressing portion are disposed with an interval therebetween.

2. The oil pressure sensor attachment structure according to claim 1,
   wherein the oil path body has a recessed portion which is recessed downward in the up and down direction,
   wherein the oil path opening portion is provided on a bottom surface of the recessed portion, and wherein the flange portion is accommodated in the recessed portion.

3. The oil pressure sensor attachment structure according to claim 2,
wherein the oil path body has a protrusion portion which protrudes upward in the up and down direction, and
wherein the recessed portion is recessed downward from an upper surface of the protrusion portion in the up and down direction.

4. The oil pressure sensor attachment structure according to claim 2, further comprising:
a seal member which seals a portion between the bottom surface of the recessed portion and a lower surface of the sensor case,
wherein a distance between an opening edge portion of the upper side of the recessed portion in the up and down direction and the bottom surface of the recessed portion in the up and down direction is larger than a distance between the upper surface of the flange portion and the lower surface of the sensor case in the up and down direction,
wherein the pressing portion comes into contact with an upper surface of the flange portion and comes into contact with the opening edge portion of the upper side of the recessed portion, and
wherein the seal member is elastically compressed and deformed in the up and down direction in a state where the pressing portion is in contact with the opening edge portion of the upper side of the recessed portion in the up and down direction.

5. The oil pressure sensor attachment structure according to claim 1, further comprising:
a seal member which seals a portion between a portion of surroundings of the oil path opening portion in an upper surface of the oil path body and the lower surface of the sensor case,
wherein the sensor case has an accommodation recessed portion which is recessed upward from the lower surface of the sensor case in the up and down direction,
wherein the seal member is accommodated in the accommodation recessed portion,
wherein a distance between the lower surface of the sensor case and the bottom surface of the accommodation recessed portion in the up and down direction is smaller than a dimension of the seal member in a state of not being deformed in the up and down direction, and
wherein the seal member is elastically compressed and deformed in the up and down direction in a state where the pressing portion is not in contact with the upper surface of the flange portion.

6. The oil pressure sensor attachment structure according to claim 1,
wherein the fixing member has a through-hole through which the columnar portion passes in the up and down direction, and
wherein the pressing portion includes an opening edge portion of the lower side of the through-hole in the up and down direction.

7. The oil pressure sensor attachment structure according to claim 6,
wherein the fixing member has a slit which extends from an outer edge of the fixing member to the through-hole when viewed from the upper side in the up and down direction.

8. The oil pressure sensor attachment structure according to claim 1,
wherein the fixing member extends in a first direction orthogonal to the up and down direction, and
wherein the fixing portion is provided in an end portion of at least a side of the fixing member in the first direction.

9. The oil pressure sensor attachment structure according to claim 8,
wherein the fixing portion is provided in an end portion of both sides of the fixing member in the first direction.

10. The oil pressure sensor attachment structure according to claim 1,
wherein the oil pressure sensor has an electrode portion which is electrically connected to the sensor main body,
wherein the electrode portion is exposed to an outside of the sensor case, and
wherein the fixing member has a terminal portion which is in contact with the electrode portion in a state where the oil pressure sensor is attached to the oil path body.

11. The oil pressure sensor attachment structure according to claim 3,
wherein the fixing member has a plate shape which expands along a surface intersecting with the up and down direction.

12. The oil pressure sensor attachment structure according to claim 11,
wherein a plurality of the oil pressure sensors are provided,
wherein the fixing member has a plurality of the pressing portions, and
wherein each of a plurality of the pressing portions comes into contact with the upper surface of the flange portion and presses the flange portion against the oil path body with respect to each of the plurality of the oil pressure sensors.

* * * * *